US007043337B2

(12) United States Patent
Colgate et al.

(10) Patent No.: US 7,043,337 B2
(45) Date of Patent: May 9, 2006

(54) METHODS AND APPARATUS FOR ELIMINATING INSTABILITY IN INTELLIGENT ASSIST DEVICES

(75) Inventors: J. Edward Colgate, Evanston, IL (US); Alexander Makhlin, Chicago, IL (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 10/673,682

(22) Filed: Sep. 30, 2003

(65) Prior Publication Data

US 2004/0143364 A1 Jul. 22, 2004

Related U.S. Application Data

(60) Provisional application No. 60/414,851, filed on Sep. 30, 2002.

(51) Int. Cl.
*G06F 7/00* (2006.01)

(52) U.S. Cl. ...................... 700/213; 700/245; 700/258; 212/270; 212/275; 212/328; 212/330

(58) Field of Classification Search ................ 700/213, 700/245, 258; 212/270 X, 275 X, 328 X, 212/330 X
See application file for complete search history.

(56) References Cited

U.S. PATENT DOCUMENTS

| | | | | |
|---|---|---|---|---|
| 3,940,110 | A * | 2/1976 | Motoda | 254/270 |
| 4,284,978 | A * | 8/1981 | Yucius | 340/825.22 |
| 5,443,566 | A * | 8/1995 | Rushmer et al. | 212/275 |
| 6,135,301 | A * | 10/2000 | Monzen et al. | 212/275 |
| 6,204,619 | B1 * | 3/2001 | Gu et al. | 318/568.11 |
| 6,313,595 | B1 * | 11/2001 | Swanson et al. | 318/568.11 |
| 6,386,513 | B1 | 5/2002 | Kazerooni | |
| 6,394,731 | B1 * | 5/2002 | Konosu et al. | 414/5 |
| 6,460,711 | B1 * | 10/2002 | Kato et al. | 212/275 |
| 6,554,252 | B1 * | 4/2003 | Kazerooni et al. | 254/270 |
| 6,575,317 | B1 * | 6/2003 | Taylor | 212/285 |
| 6,612,449 | B1 * | 9/2003 | Otani et al. | 212/317 |
| 6,668,668 | B1 * | 12/2003 | Peshkin | 73/862.56 |
| 6,738,691 | B1 * | 5/2004 | Colgate et al. | 700/245 |
| 6,796,447 | B1 * | 9/2004 | Laundry et al. | 212/275 |
| 2002/0111712 | A1 * | 8/2002 | Peshkin et al. | 700/230 |
| 2002/0112016 | A1 | 8/2002 | Peshkin et al. | |
| 2004/0026349 | A1 * | 2/2004 | Colgate et al. | 212/284 |

FOREIGN PATENT DOCUMENTS

| | | |
|---|---|---|
| EP | 0 733 579 | 9/1996 |
| WO | WO 02/32804 | 4/2002 |
| WO | WO 02/070389 | 9/2002 |

* cited by examiner

*Primary Examiner*—Khoi H. Tran
(74) *Attorney, Agent, or Firm*—Pillsbury Winthrop Shaw Pittman, LLP

(57) ABSTRACT

Methods and apparatus for eliminating instability in intelligent assist devices are disclosed. The intelligent assist device includes an overhead motorized moveable trolley, a support that extends downwardly from the trolley to a payload, and a sensor operatively coupled to the support to sense a characteristic of motion imparted by a human operator to the device. A controller is operatively coupled with the sensor and the trolley to control movements of the trolley. The controller estimates an amount of oscillation in the support that does not correspond to the motion imparted by the human operator and adjusts movements of the trolley based thereon.

37 Claims, 9 Drawing Sheets

METHODS AND APPARATUS FOR ELIMINATING INSTABILITY IN INTELLIGENT ASSIST DEVICES

CROSS-REFERENCE TO RELATED APPLICATIONS

This application claims the benefit of priority to U.S. Provisional Application No. 60/414,851, titled "IDENTIFICATION AND CONTROL MEANS FOR ELIMINATING INSTABILITY IN INTELLIGENT ASSIST DEVICES," filed Sep. 30, 2002, which is incorporated by reference herein in its entirety.

BACKGROUND OF THE INVENTION

1. Field of the Invention

This present invention relates in general to the field of programmable robotic manipulators, and assist devices that can interact with human operators.

2. Description of Related Art

Intelligent Assist Devices ("IADs") are computer-controlled machines that aid a human worker in moving a payload. IADs may provide a human operator a variety of types of assistance, including supporting payload weight, helping to overcome friction or other resistive forces, helping to guide and direct the payload motion, or moving the payload without human guidance.

IAD characteristics have been fully described in the following commonly owned U.S. Patent Applications: U.S. patent application Ser. No. 09/781,801, titled "MODULES FOR USE IN AN INTEGRATED INTELLIGENT ASSIST SYSTEM", filed Feb. 12, 2001, now U.S. Pat. No. 6,813,542, issued Nov. 2, 2004; U.S. patent application Ser. No. 09/781,683, titled "SYSTEM AND ARCHITECTURE FOR PROVIDING A MODULAR INTELLIGENT ASSIST SYSTEM," filed Feb. 12, 2001, now U.S. Pat. No. 6,928,336, issued Aug. 9, 2005; U.S. patent application Ser. No. 10/147,141, titled "INTENT SENSOR FOR INTELLIGENT ASSIST DEVICES," filed May 16, 2002, now U.S. Pat. No. 6,738,691, issued May 18, 2004; and U.S. Pat. No. 10/431,582, titled "METHODS AND APPARATUS FOR MANIPULATION OF HEAVY PAYLOADS WITH INTELLIGENT ASSIST DEVICES," filed May 8, 2003, currently pending, the contents of which are all incorporated by reference herein in their entireties.

IADs typically use controllers that are closed loop systems. Any given controller is programmed to allow the IAD to operate efficiently and effectively. However, closed loop systems may make the IADs susceptible to instability, such as self-sustained or growing oscillations within the IAD. Whether or not instability will occur within a particular system depends on various system parameters and dynamic effects. Although instability in IADs is undesirable, current systems do not address instability. As a result, current IADs may not be capable of maintaining peak performance for a wide range of system parameters.

SUMMARY OF THE INVENTION

At least one embodiment of the present invention may provide an intelligent assist device ("IAD") that is capable of maintaining peak performance for a wide range of system parameters.

Embodiments may be described herein as relating to an intelligent assist device that includes an overhead motorized moveable trolley, a support that extends downwardly from the trolley to a payload, and a sensor operatively coupled to the support to sense a characteristic of motion imparted by a human operator to the device. A controller is operatively coupled with the sensor and the trolley and controls movements of the trolley. The controller estimates an amount of oscillation in the support that does not correspond to the motion imparted by the human operator and adjusts movements of the trolley based thereon.

Embodiments may also include method for controlling movement of an overhead moveable trolley in an intelligent assist device. The method includes sensing a characteristic of motion imparted by a human operator to the device, estimating an amount of oscillation in the device that does not correspond to the motion imparted by the human operator, and adjusting movements of the trolley based upon the estimate.

Embodiments may further include a method for controlling movement of an overhead moveable trolley in an intelligent assist device. The method includes sensing tension in a cable that extends downwardly from the trolley to a payload, controlling the trolley based on the sensed tension, determining when changes in the sensed tension are below a threshold level, and adjusting movements of the trolley based upon the changes in the sensed tension that are below the threshold level.

Embodiments may also include an intelligent assist device that includes an overhead motorized moveable trolley, a support that extends downwardly from the trolley to a payload, and a sensor operatively coupled to the support to sense a characteristic of motion imparted by a human operator to the device. A controller is operatively coupled with the sensor and the trolley and controls movements of the trolley. The controller identifies oscillations in the support above a threshold level and adjusts movements of the trolley based thereon.

Embodiments may further include a method for controlling movement of an overhead moveable trolley in an intelligent assist device. The method includes sensing a characteristic of motion imparted by a human operator to the device, identifying oscillations in the device above a threshold level, and adjusting movements of the trolley based upon the identification.

These and other aspects of embodiments of the invention will become apparent when taken in conjunction with the following detailed description and drawings.

BRIEF DESCRIPTION OF THE DRAWINGS

Features of the invention are shown in the drawings, which form part of this original disclosure. Embodiments of the invention will be described in conjunction with the following drawings, in which.

DETAILED DESCRIPTION OF EMBODIMENTS OF THE INVENTION

While much of what is presented below is described in the context of "cable-based" IADs, embodiments of the present invention are not limited to cable-based IADs, but may be applied to virtually any type of IAD.

Figure 1A:
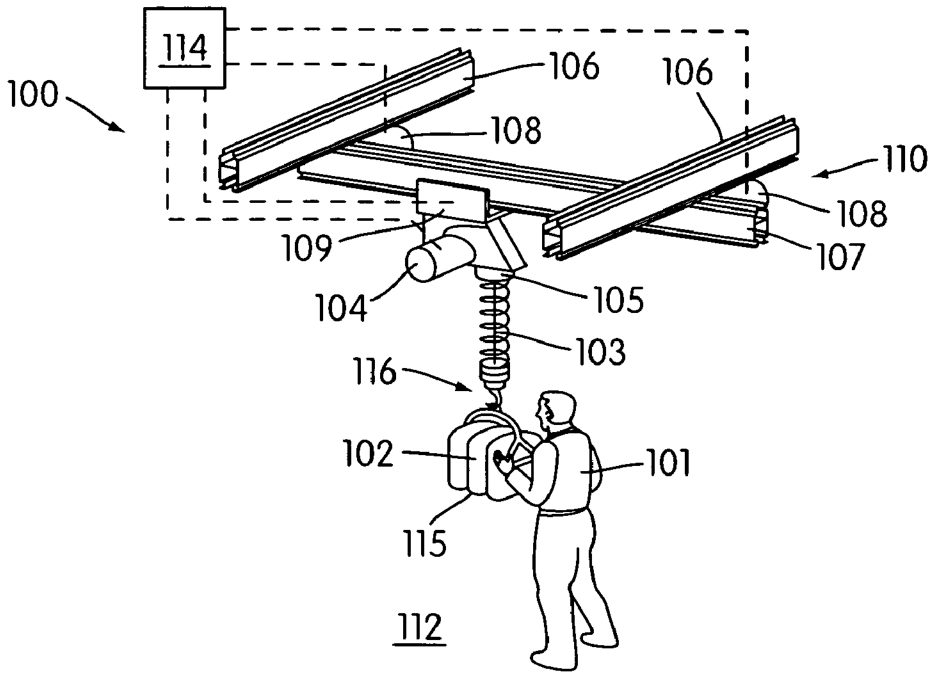
FIG. 1*a* is a top perspective view of at least one embodiment of an intelligent assist device ("IAD") of the present invention.

FIG. 1 *a* shows at least one embodiment of an IAD 100 of the present invention. The IAD 100 of FIG. 1*a* is a cable-based IAD. As shown in FIG. 1*a*, a human operator 101 may push directly on a payload 102 that is supported by a cable 103 or support. The cable 103 is a part of a hoist 104 and may be raised or lowered. A cable angle sensor 105 detects slight variations of an angle of the cable 103 from a substantially vertical axis, and uses these variations as a measure of the motion intent of the human operator 101. The human operator's motion intent may be determined by sensing a characteristic of motion imparted by the human operator 101 to the IAD 100. IADs generally aid a human worker by detecting the human's motion intent, and then moving the top end of the cable 103 to comply.

The IAD 100 also includes an overhead structure 110. The overhead structure 110 includes runways rails 106 which are fixed relative to a plant floor 112, and a bridge rail 107 which may move slidably along the runway rails 106. This motion may be powered by motorized trolley units 108. Trolleys as defined herein include any moveable overhead structure that allows a payload to be moved from a first position to a second position.

The top end of the cable 103, the hoist 104, and the cable angle sensor 105 may move as a unit slidably along the bridge rail 107. This motion may be powered by an additional motorized trolley unit 109. As shown in FIG. 1*a*, the IAD 100 also includes a controller 114 that is coupled with the cable angle sensor 105 and the motorized trolley units 108, 109. In at least one embodiment of the IAD 100, the speeds of the motorized trolley units 108, 109 are determined by the controller 114, based on the direction and magnitude of the cable angle as measured by the cable angle sensor 105.

As would be understood by one of ordinary skill in the art, the term cable-based IAD applies to any IAD in which the payload is suspended from an overhead moveable structure via a support that may swing freely about one or more horizontal axes. Such supports include but are not limited to cables and chains.

Figure 1B:
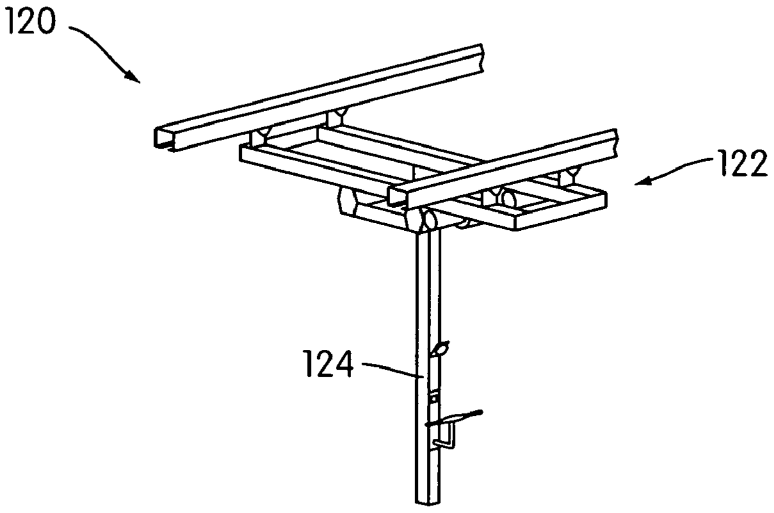
FIG. 1*b* is a top perspective view of another embodiment of the IAD of the present invention.

FIG. 1*b* illustrates another embodiment of an IAD 120 of the present invention. The IAD 120 of FIG. 1*b* is a "rigid descender" IAD. Here, the payload (not shown) is supported from an overhead moveable structure 122 via a support 124 that may not swing freely about a substantially horizontal axis.

Of course, there are many possible variations on this basic architecture that are encompassed by embodiments of the present invention. For example, instead of a powered bridge crane, a powered gantry crane, powered jib crane, powered monorail, or any other crane architecture known in the art may be substituted. Also, instead of a cable, a chain or any other member capable of swinging freely from the overhead moveable structure may be substituted. Further, instead of a cable angle sensor, a force sensor or any other sensor for detecting a characteristic of motion imparted by a human operator to the device that is known in the art may be substituted.

It should be understood that cable angle may be measured with a true angle sensor or it may be inferred from one or more measurements of the cable's horizontal displacement. In the context of this disclosure, the term "cable angle sensing" should be understood to encompass these methods as well as others methods that may be used to estimate the deflection of a cable or chain from the vertical axis.

Figure 2A:
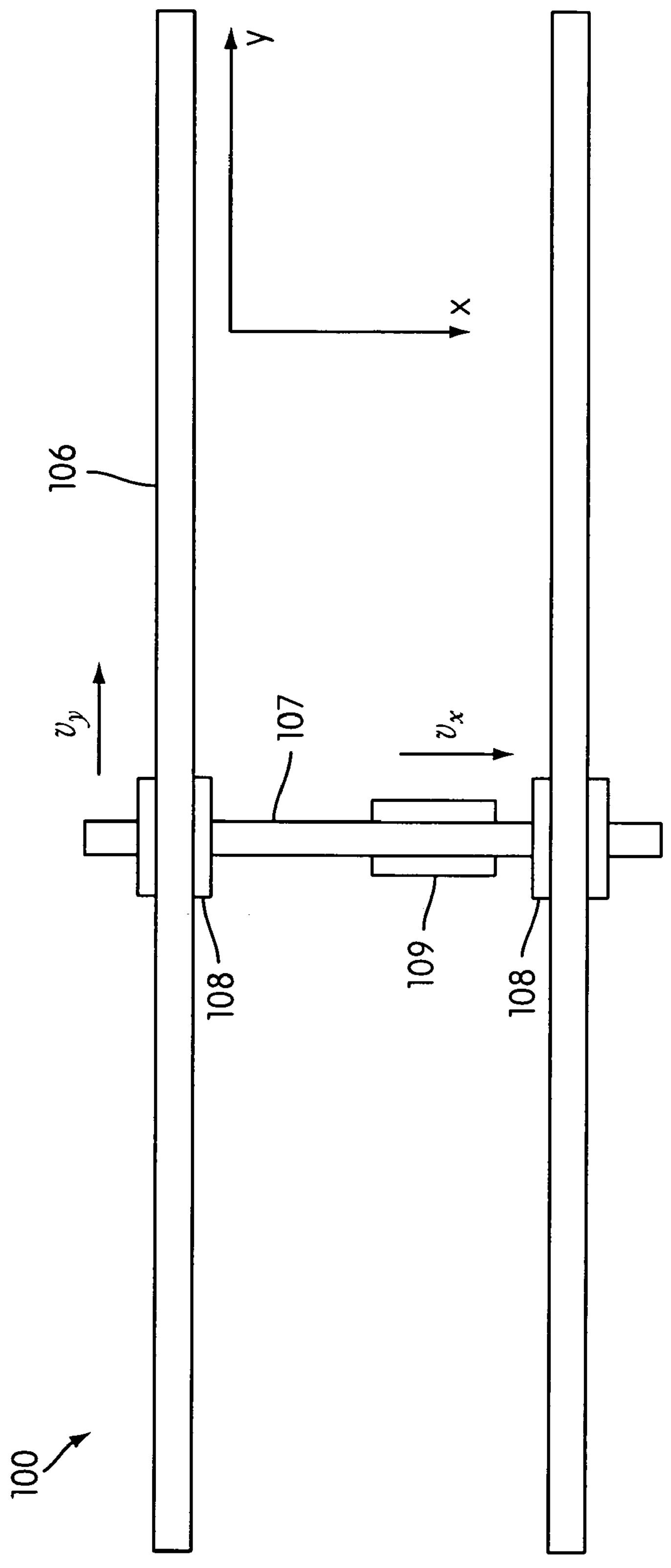
FIG. 2*a* is a top schematic view of the IAD of FIG. 1*a;*
Figure 2B:
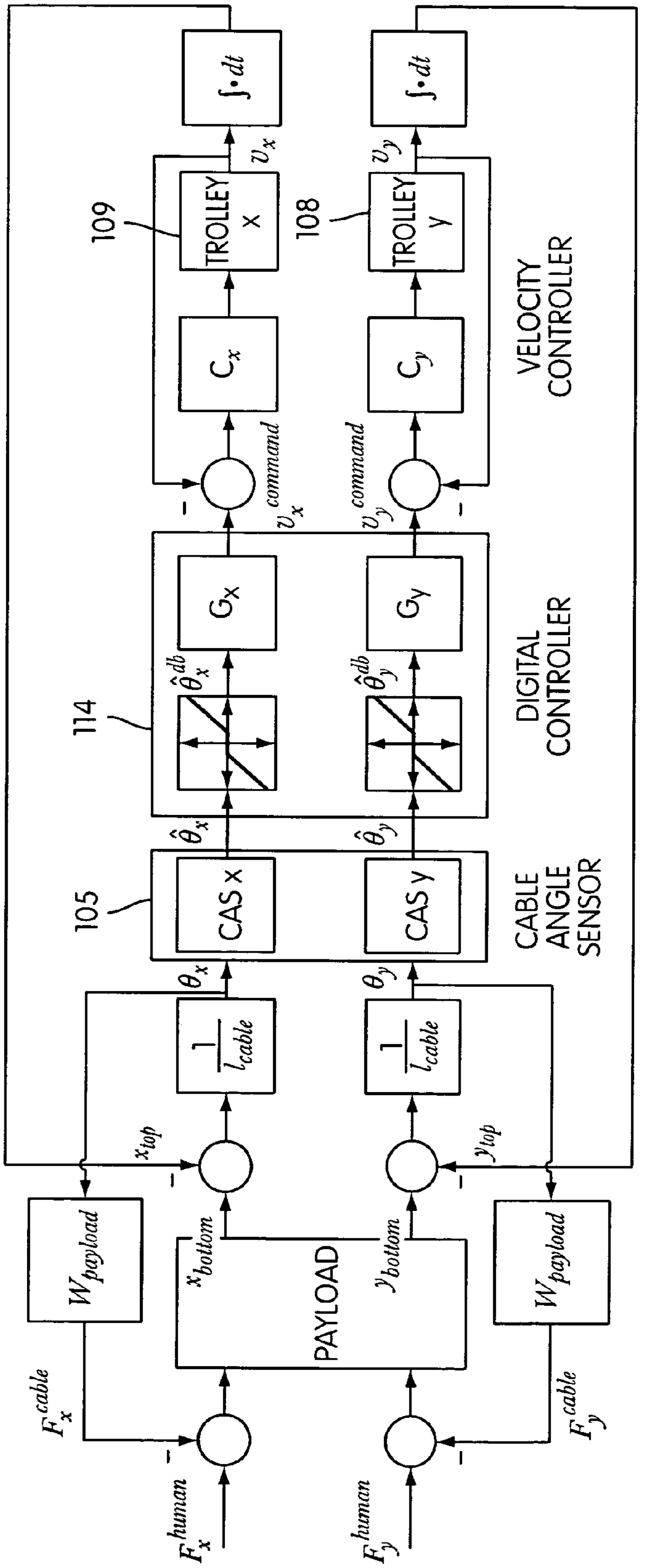
FIG. 2*b* is a schematic block diagram of the dynamics and control of at least one embodiment of the IAD of the present invention.

A typical control structure for the IAD 100 of FIG. 1*a* is illustrated in FIG. 2*b*, with reference to FIGS. 1*a* and 2*a*. Motion is initiated by the human operator 101 pushing on the payload 102. The operator 101 may push the payload 102 in any horizontal direction. It is recognized that the vertical direction may be included in the control structure as well. A characteristic of motion imparted by the operator 101 is force, which is represented by its components in the x (bridge) and y (runway) directions:

$$\{F_x^{human}, F_y^{human}\}.$$

As the payload 102 begins to move, it drags the bottom of the cable 103, represented by $\{x_{bottom}, y_{bottom}\}$, along with it. Any difference between the location of the bottom and the location of the top of the cable 103, $\{x_{top}, y_{top}\}$, causes some cable angle that, for small angles, may be accurately estimated as:

$$\theta_x = \frac{x_{bottom} - x_{top}}{l_{cable}}$$

$$\theta_y = \frac{y_{bottom} - y_{top}}{l_{cable}}$$

Due to the tension in the cable 103, a non-vertical cable will exert horizontal forces on the payload 102. For small angles, these forces are approximately:

$$F_x^{cable} = W_{payload}\theta_x$$

$$F_y^{cable} = W_{payload}\theta_y$$

If the payload 102 is not accelerating up or down, then the tension is approximately equal to the weight of the payload 102, $W_{payload}$.

The IAD controller 114 attempts to minimize these forces by keeping the top of the cable 103 directly above the bottom of the cable 103. This is tantamount to keeping the cable angle at zero, where zero corresponds to vertical.

In at least one embodiment, the IAD controller 114 operates as illustrated in FIG. 2. The cable angle sensor 105 measures $\{\theta_x, \theta_y\}$ producing the measurement $\{\hat{\theta}_x, \hat{\theta}_y\}$. Both the x and y components of the cable angle measurement are put through a deadband function to minimize the effects of sensor drift and sensor offset, then the output of the deadband functions $\{\hat{\theta}_x^{db}, \hat{\theta}_y^{db}\}$ are each multiplied by a gain factor $\{G_x, G_y\}$ to produce velocity commands $\{v_x^{command}, v_y^{command}\}$ for the motorized trolleys 108, 109. Each motorized trolley 108, 109 is controlled by a velocity controller $\{C_x, C_y\}$ of known type. The effect of the velocity controller is to make the motorized trolley respond quickly and accurately to velocity commands. If the gains $\{G_x,G_y\}$ are large enough, the trolleys 108, 109 will move quickly for even small cable angles, and the top of the cable 103 will remain approximately above the bottom of the cable 103. More sophisticated control schemes are, of course, possible. For instance, it is possible to include integral and derivative terms in addition to the proportional gains $\{G_x,G_y\}$, and it is possible to use other sensor data if they are available, such as a measure of the payload weight $W_{payload}$ or the cable length $l_{cable}$. Several other control schemes are discussed in commonly owned and co-pending U.S. Pat. No. 10/431,582, titled "METHODS AND APPARATUS FOR MANIPULATION OF HEAVY PAYLOADS WITH INTELLIGENT ASSIST DEVICES," filed May 8, 2003, which is incorporated by reference in its entirety, as noted above.

The IAD controller 114 illustrated in FIG. 2*b* is a closed loop system. As such, it is susceptible to instability, as are all closed loop systems. Instability in an IAD can take many forms, but often involves the excitation of one of the natural modes of vibration of the IAD structure, including the payload. Whether or not instability will occur depends on the gains $\{G_x,G_y\}$ as well as various system parameters and dynamic effects. Typically, an IAD may become unstable for one of a variety of reasons. For example, one of the gains $\{G_x,G_y\}$ may be too large or the cable 103 may become too short. FIG. 2*b* shows that the loop gain is proportional to $l_{cable}$, so that shortening the cable causes much the same effect as increasing the gains $\{G_x,G_y\}$. Because the cable 103 is generally part of a hoisting system, its length may vary significantly during a task. Ideally, a measure of length is available and the gains $\{G_x,G_y\}$ are modified according to $l_{cable}$. In many instances, however, a measure of length is not available.

Also, as shown in FIG. 1*a*, the bridge rail 107 is torsionally compliant and the center of gravity of the motorized trolley 109 lies below the bridge rail 107. This combination tends to excite torsional oscillations when the trolleys 108 accelerate rapidly. In another example, the payload weight $W_{payload}$ may become too small. This has an effect somewhat similar to that of a short cable. Because the payload 102 typically includes both an object 115 to be manipulated and an end effector 116 for coupling to that object 115, $W_{payload}$ can change dramatically when the object 115 is picked up or dropped off.

Moreover, if the cable tension decreases to zero or near-zero, which may occur if the payload 102 is set down on a support surface, the cable 103 may go slack, thereby causing the cable 103 to deform, i.e., take on some shape other than that of a straight line. Cable deformation may be erroneously identified as cable deflection, which will cause the motorized trolley 108, 109 to move. The closed loop system will cause the movement of the trolley 108, 109 to be highly erratic because the controller 114 will be unable to determine the proper location for the trolley 108, 109.

Figure 3A:
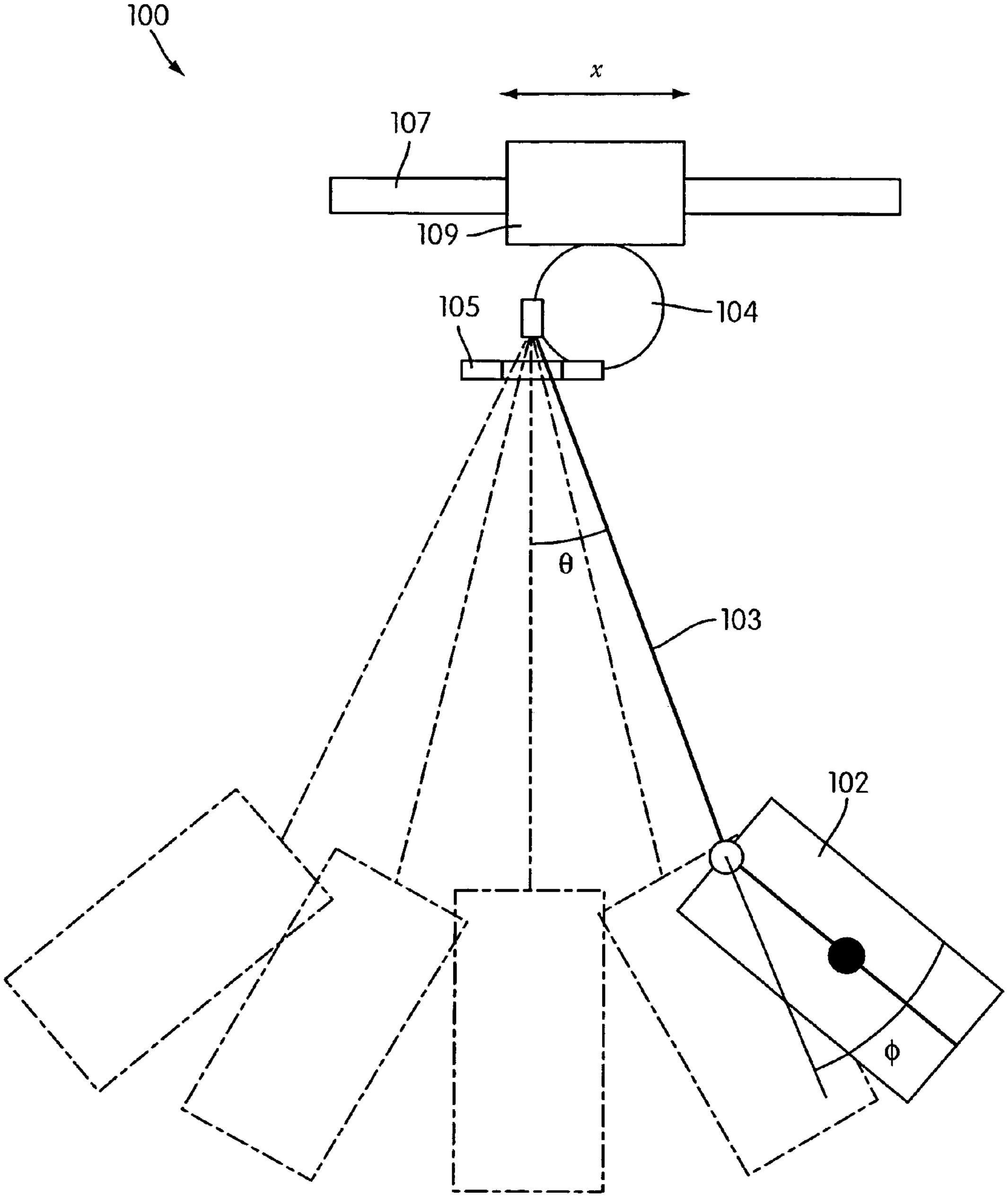
FIG. 3*a* is a schematic of the IAD of FIG. 1, with a cable and a payload oscillating in-phase.
Figure 3B:
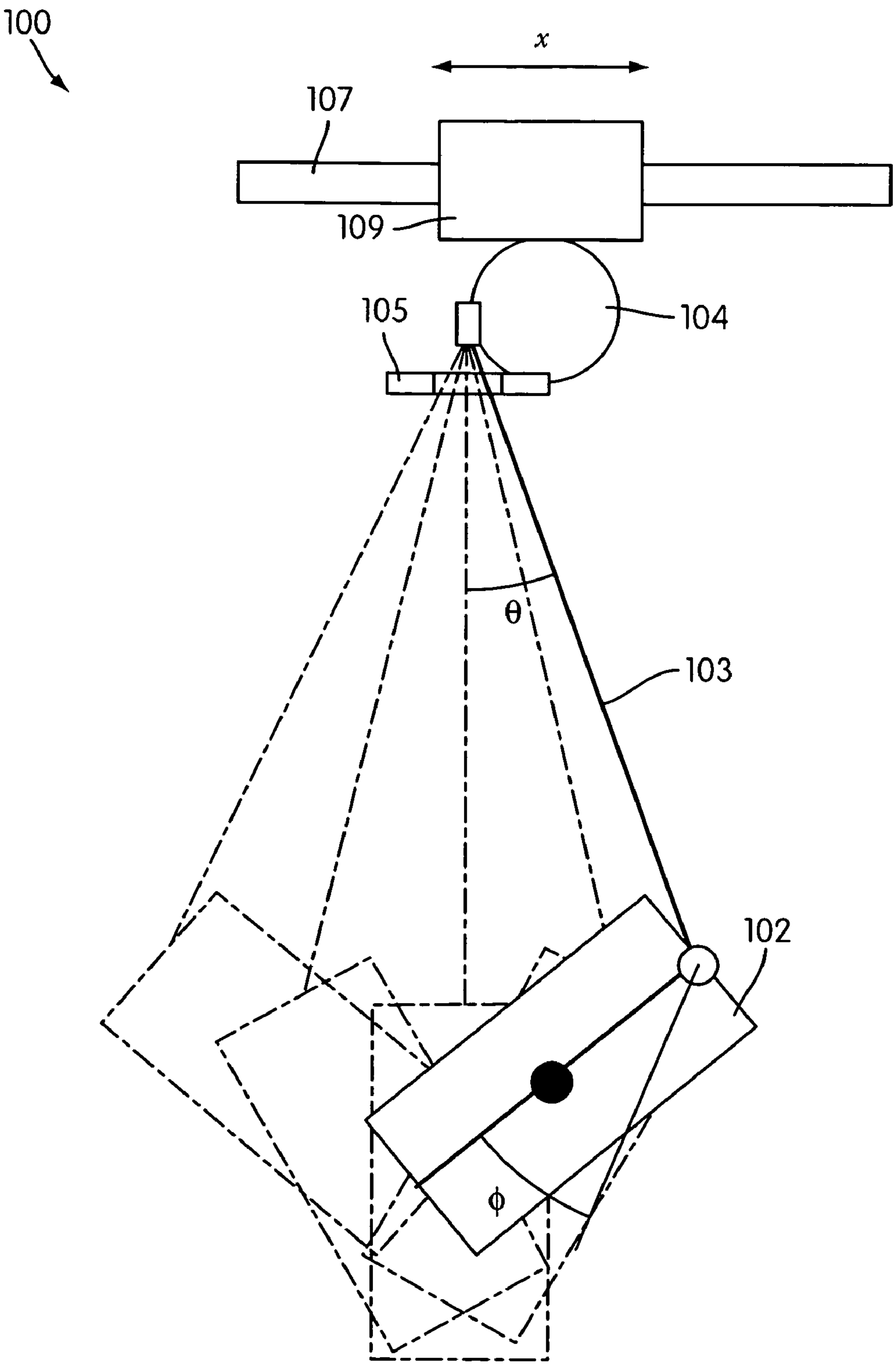
FIG. 3*b* is a schematic of the IAD of FIG. 1, with the cable and payload oscillating out-of-phase.

FIGS. 3*a* and 3*b* illustrate two natural modes of vibration of a typical cable-based IAD 100. The two natural modes illustrated in FIGS. 3*a* and 3*b* involve motion of the overhead motorized trolley 109 along the overhead bridge rail 107 (x), swinging of the cable 103 ($\theta$), and swinging of the payload 102 ($\phi$). Note that the angle $\phi$ is understood to be measured relative to the cable angle $\theta$, not relative to the absolute vertical.

FIG. 3*a* illustrates the lowest frequency mode, in which the two swinging motions are in phase with one another. In other words, as the cable 103 swings in a clockwise direction, so does the payload 102. FIG. 3*b* illustrates a higher frequency mode, in which the two swinging motions are out of phase with one another. As the cable 103 swings in a clockwise direction, the payload 102 swings in a counter-clockwise direction.

As a general rule, the higher frequency natural mode, illustrated in FIG. 3*b* is more susceptible to instability than the lower frequency natural mode, illustrated in FIG. 3*a*. This is because IAD controllers often tend to damp out oscillations of the lower frequency mode. Any of the conditions presented above (e.g., high gain, short cable, etc.) can increase the possibility of self-sustained oscillations of the sort shown in FIG. 3*b*. In addition, even higher frequency modes, such as those associated with torsional oscillation of the bridge rail 107, may also become unstable.

Figure 4:
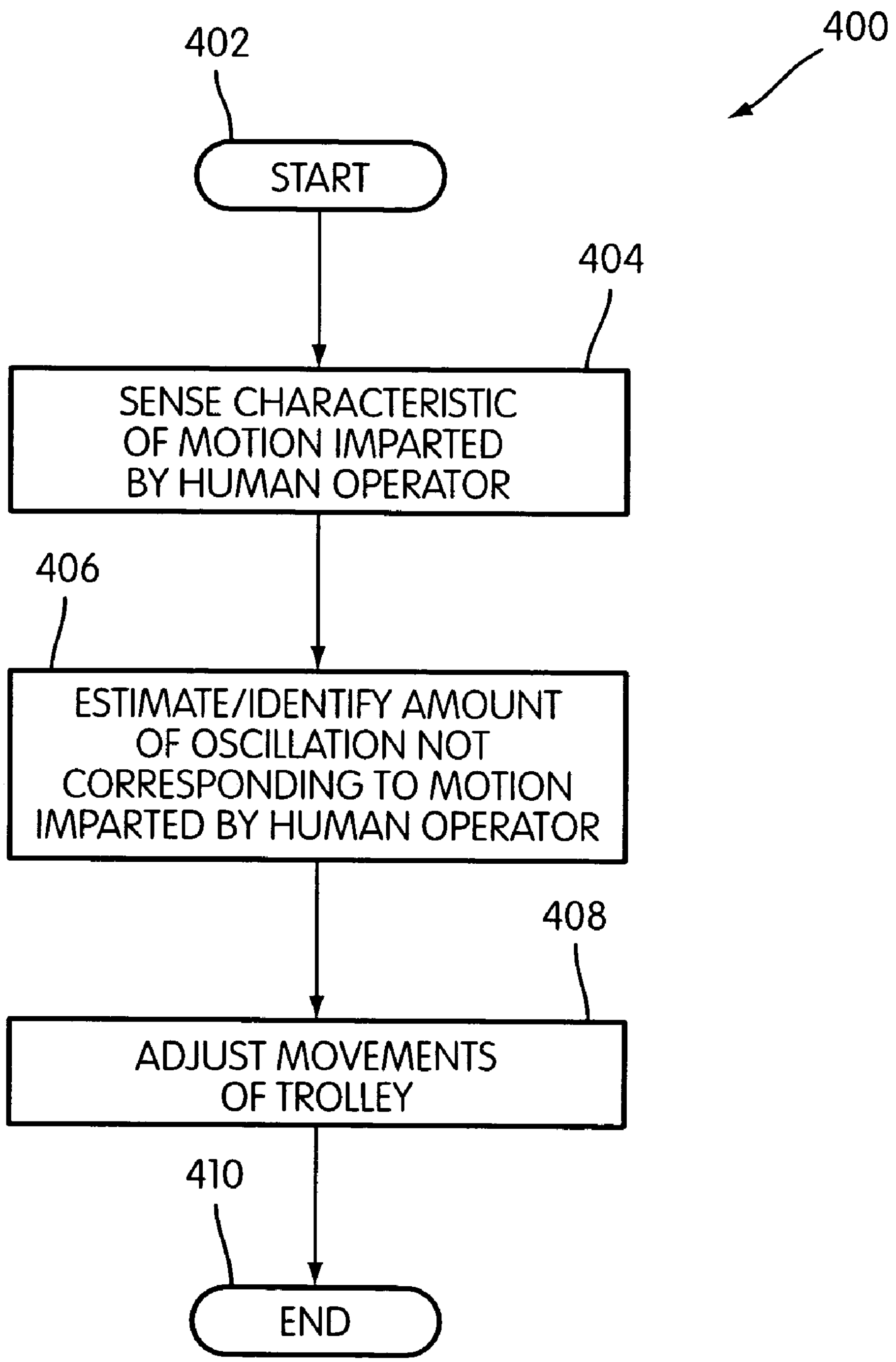
FIG. 4 is a flow diagram of at least one embodiment of a method of the present invention.

FIG. 4 illustrates at least one embodiment of a method 400 of the present invention. The method 400 for controlling movement of an overhead moveable trolley in an IAD starts at 402. At 404, a characteristic of motion imparted by a human operator to the IAD is sensed. At 406, an amount of oscillation in the IAD that does not correspond to the motion imparted by the human operator is estimated. Alternatively, at 406, oscillations in the device, such as in the support of the device, that are above a threshold level are identified. Movements of the trolley are adjusted based upon the estimate, or, alternatively, based upon the identification, at 408. The method ends at 410.

Figure 5:
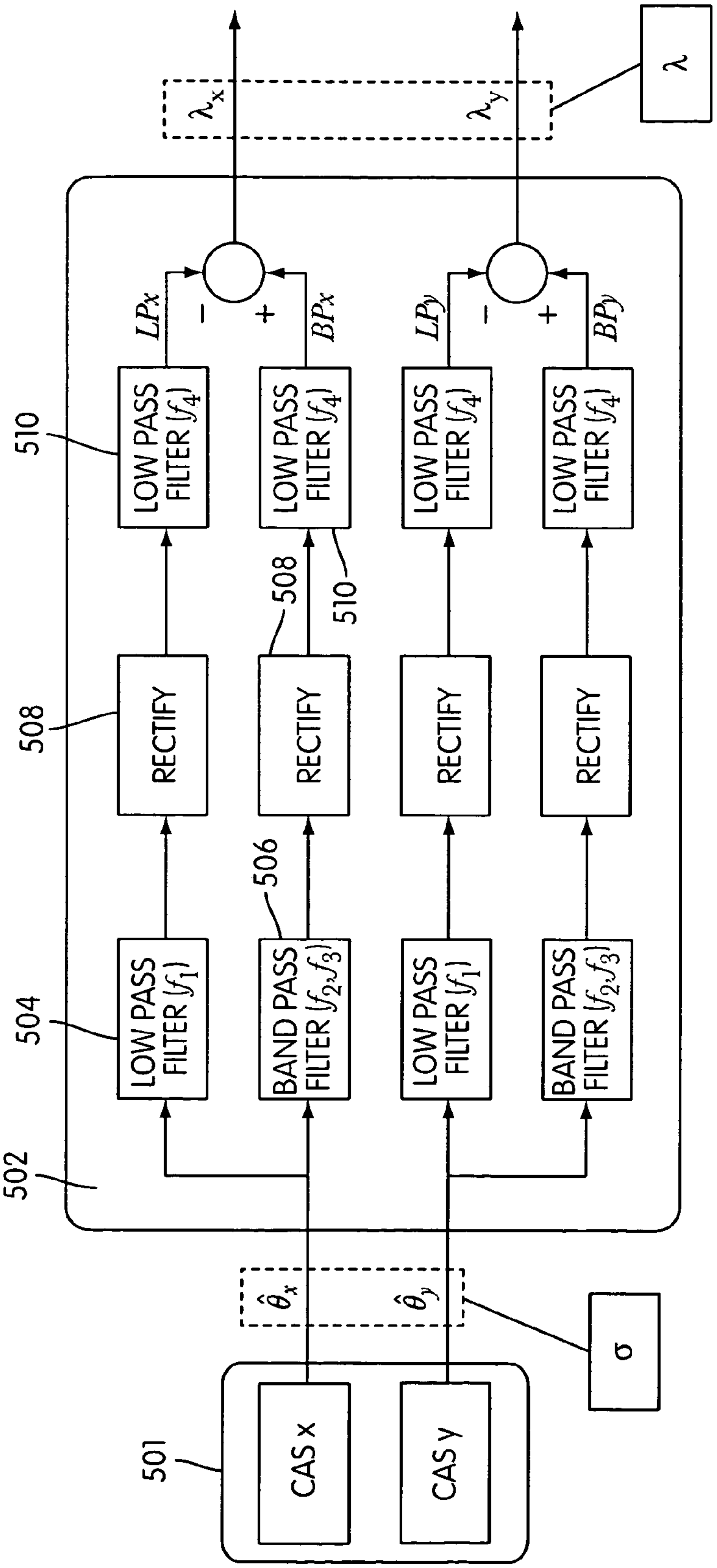
FIG. 5 is a schematic block diagram of an algorithm for identifying instability in an IAD of at least one embodiment of the present invention.

FIG. 5 is a schematic of at least one embodiment of the method 400 of FIG. 4. Sensor data a from one or more sensors 501 on the IAD are input to an algorithm 502 that runs in real-time. The algorithm 502 computes a measure or measures of instability $\lambda$. The algorithm 502 may output a single measure for the IAD as a whole, it may output one measure for each axis, or it may output several measures for variables of interest, such as the stability of each mode.

The measure or measures of instability $\lambda$ are used as a basis for action. In at least one embodiment, actions may include adjusting the movements of the trolleys by modifying the gain G (shown in FIG. 2) or other gains that may exist in more sophisticated controllers, or alerting the operator.

In at least one embodiment of the present invention, the estimation/identification step 406 of FIG. 4 uses information from a cable angle sensor 501. The estimation/identification step 406 of FIG. 4 is also illustrated schematically in FIG. 5. FIG. 5 illustrates the application of the algorithm 502 to both the x axis and y axis signals obtained from the cable angle sensor 501. Although the algorithm 502 is discussed in the context of only a single axis, one of ordinary skill in the art would understand that it is structurally the same for both axes and certain parameters, such as filter cut-off frequencies, may be modified for a particular axis.

As illustrated in FIG. 5, the signal from the cable angle sensor ($\hat{\theta}_x$) is passed through two separate filters, including a low pass filter 504 having a cut-off frequency of $f_1$, and a band pass filter 506 having low frequency and high frequency cut-offs of $f_2$ and $f_3$, respectively. The purpose of this is to isolate, approximately, frequency content originating from a human operator from frequency content originating in self-sustained oscillations. Even though a human operator will generate a range of frequencies, he or she will virtually always generate significantly lower frequency content in the cable angle sensor output as well.

Likewise, although an instability (self-sustained oscillation) may also excite a range of frequencies, most of the frequency content will be in a band close to the natural frequency of the mode illustrated in FIG. 3*b*. The low pass filter 504 and band pass filter 506 may be implemented digitally or in analog, and may be of any of a variety of types known in the art. In at least one embodiment, the filters 504, 506 are both fourth-order Butterworth filters, implemented digitally. The cut-off frequencies $f_1$, $f_2$, and $f_3$ may be adjusted as appropriate for the particular IAD. In at least one embodiment, $f_1$=0.5 Hz, $f_2$=1.5 Hz, and $f_3$=5.0 Hz.

The output signals from both filters 504, 506 are rectified by a rectifier 508 and passed through a low pass filter 510 having a cut-off frequency $f_4$. The rectifier 508 and low pass filters 510 may be implemented digitally or in analog. The filter 510 may be of any of a variety of types known in the art. In at least one embodiment, the low pass filter 510 is a second-order Butterworth filter having a cut-off frequency of $f_4$=0.5 Hz. The purpose of rectification and low pass filtering is to obtain a measure of signal strength. Any of a number of other measures of signal strength known in the art (e.g. root mean square) may be used as well.

Once both measures of signal strength are obtained, they are compared to obtain an overall measure of instability ($\lambda_x$). In at least one embodiment, the measure is obtained as:

$$\lambda_x = BPx - LPx$$

Of course, other types of comparisons, such as a ratio of the two signal strengths, might be used as well. In at least one embodiment, the more positive $\lambda_x$, the more unstable the IAD is judged to be.

In addition to the embodiment of the identification algorithm 502 illustrated in FIG. 5, many other approaches are feasible as well. For example, in another embodiment, if a direct measurement of the angle $\phi$ (FIGS. 3*a* and 3*b*) is available, then the phase relationship between $\theta$ and $\phi$, along with the amplitude of those signals, may be used as a measure of instability. If the two angles are out of phase and large enough, then it may be concluded that significant energy is being put into the mode illustrated in FIG. 3*b*. This energy would much more likely originate from self-sustained oscillations than human input.

If direct measurement of $\phi$ is not available, it may still be possible to estimate $\phi$ using an observer of known type including but not limited to a Kahlman filter. The same strategy based on phase relationships and signal strength could then be applied as if $\phi$ had been measured directly.

Also, in another embodiment, instead of using a band pass filter, as shown in FIG. 5, it is possible to detect the presence of unstable oscillations by the zero crossings of a sensor signal that occur within a given time period. Enough zero crossings will indicate a signal that is rapidly reversing; i.e., oscillating.

Still another embodiment may be based on the performance of the feedback controller that governs the speed of the motorized trolleys. Many IADs use velocity controllers to ensure that the trolleys can faithfully track velocity commands, such as those called out in FIG. 2*b*. Velocity controllers, however, tend to perform best at low frequencies. At higher frequencies, performance degrades, meaning that the error between the commanded velocity and actual velocity grows. Thus, one way to monitor the degree of high frequency instability is to measure the magnitude of the velocity error. The size of the error signal may be determined in a variety of ways known in the art, including rectifying it and low pass filtering the rectified signal.

Once a measure of instability has been obtained, it is necessary to take some action to eliminate or minimize the instability. The simplest action is to alert the operator when the instability signal ($\lambda$) grows above some threshold. The operator can choose to shut down the system, change operating conditions (e.g., lengthen the cable), or manually change the feedback gains. It would be desirable, however, to take action without distracting the operator or requiring work stoppage.

Figure 6:
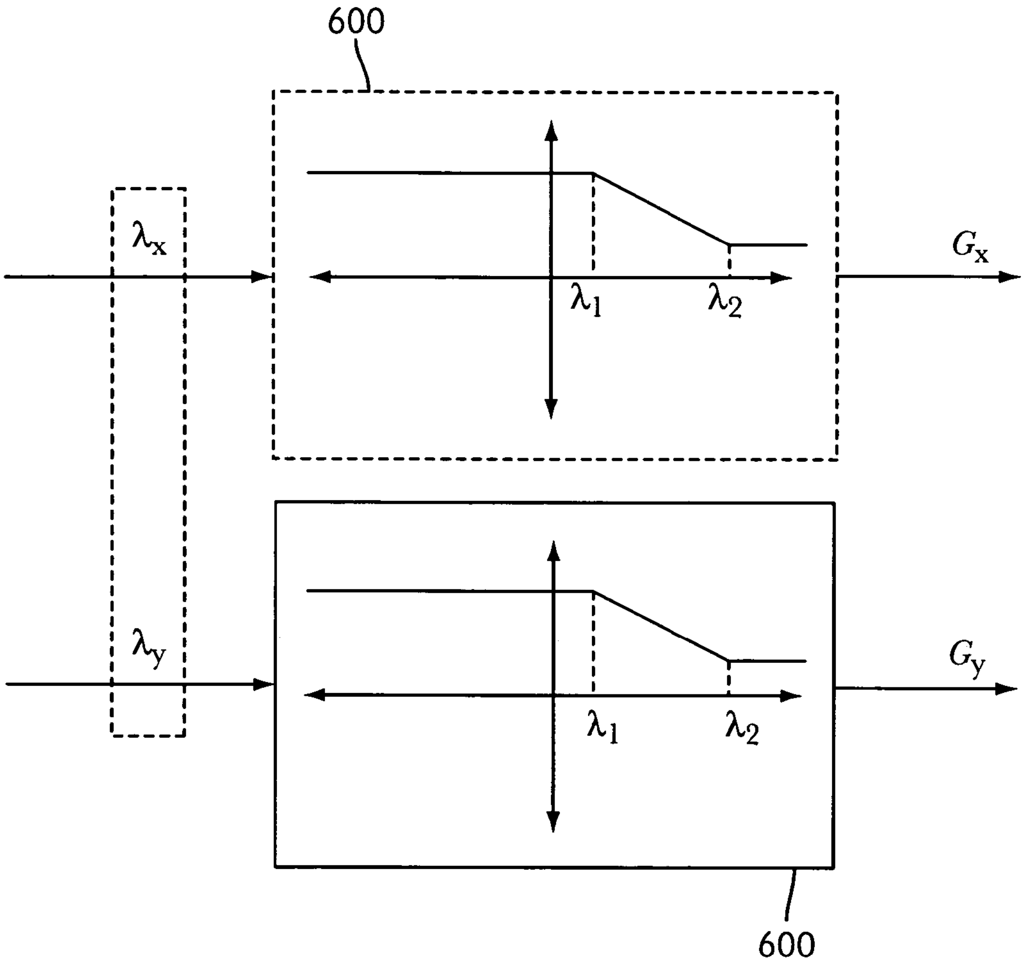
FIG. 6 is a schematic block diagram of at least one method for adjusting feedback gains based on the level of instability of the IAD of at least one embodiment of the present invention.

FIG. 6 illustrates at least one embodiment for adjusting the movements of the trolley 410. The instability measure for each axis is mapped at 600 into a gain factor. The mapping would typically have the following characteristics (here the mapping for the x axis is described; it would be similar for the y axis). If $\lambda_x < \lambda_1$, where $\lambda_1$ is a lower threshold value (typically positive), the behavior is stable, and the gain factor $G_x$ is set to its maximum value, $G_x^{max}$.

If $\lambda_1 \leqq \lambda_x < \lambda_2$, where $\lambda_2$ is an upper threshold value, the behavior is growing unstable with the degree of instability related to the magnitude of $\lambda_x$. The gain factor can be adjusted according to the degree of instability as follows:

$$G_x = G_x^{max} - \frac{G_x^{max} - G_x^{min}}{\lambda_2 - \lambda_1}(\lambda_x - \lambda_1)$$

Of course, this formula is only representative. Many other relationships including those that are nonlinear, may be substituted. In at least one embodiment, the gain is adjusted to a more conservative value as the degree of instability increases. If $\lambda_2 \leqq \lambda_x$, the gain factor $G_x$ is set to a minimum value, $G_x^{min}$.

While this embodiment addresses only IAD controllers with proportional feedback gains, $\{G_x, G_y\}$, the concept may be easily extended to more complex controllers with additional feedback gains (e.g., proportional, derivative and integral gains).

Another modification to the embodiment described above is the addition of memory. For example, if the gain factor is reduced due to unstable behavior, then it can be forced to remain low for a period of time after the resumption of stable behavior.

While the above discussion has focused on the identification and handling of instability in cable-based IADs, it should be evident that the methods discussed herein can be applied to other types of IADs, including those with rigid descenders, as shown in FIG. 1*b*, those that operate principally in a vertical direction, and those that operate in other axes such as roll, pitch and yaw. The only requirements are that a sensor signal or signals exist for which self-induced oscillations and human-induced oscillations can be discriminated, and that it be possible to adjust feedback gains (typically reduce gains) to more conservative values.

Another aspect of the present invention is to provide a method to respond to a slack cable such that a cable-based IAD will not exhibit erratic behavior. This requires a way to detect cable slack, and a way to respond to a positive detection. Various ways of detecting cable slack are known in the art, and several have been described in U.S. Pat. No. 6,386,513 (Kazerooni).

Figure 7:
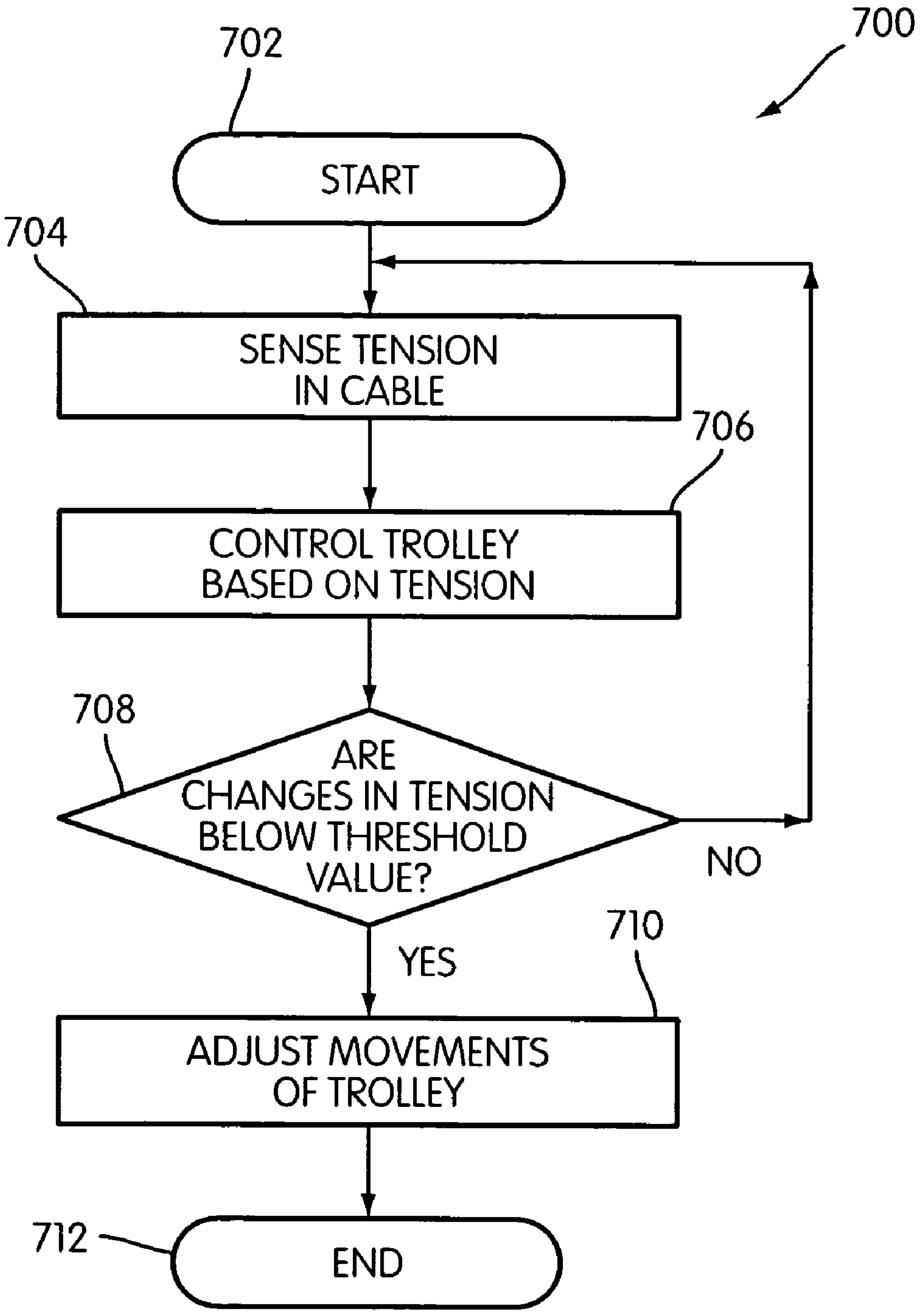
FIG. 7 is a flow diagram of another embodiment of a method of the present invention.

FIG. 7 illustrates another embodiment of a method of the present invention. A method 700 for controlling movement of an overhead movable trolley in an IAD starts at 702. At 704, tension in a cable that extends downwardly from the trolley a payload is sensed. The cable tension may be sensed directly with a load cell or similar force-sensing device. The trolley is controlled based on the sensed tension at 706. At 708, it is determined whether changes in the sensed tension are below a threshold level. If changes in the sensed tension are above a threshold level, the method returns to 704. If changes in the sensed tension are below a threshold level, movements of the trolley are adjusted at 710. The method ends at 712.

Because such a measurement of tension is typically noisy, in terms of the signal, and because cable tension may drop to near zero for brief periods during normal IAD operation (e.g., when accelerating the load downward at near to 1 G), it is generally necessary to filter the cable tension signal at a fairly low frequency. In at least one embodiment, the cable tension signal is filtered with a second order Butterworth filter having a cutoff frequency of 1 Hz. Once this signal drops below a given threshold, the cable is determined to have gone slack.

It is of course possible to reduce the gains $G_x$ and $G_y$ smoothly in accordance to the cable tension signal (such a controller would be analogous to the one described above for responding to instability). The main concern with cable slack, however, is that a slack cable may deform, and a deformed shape will lead to erroneous cable angle signals. The transition from a straight, undeformed cable to a deformed cable generally occurs quite abruptly as tension is reduced. For this reason, at least one embodiment responds to cable slack by simply disabling the powered trolleys (equivalently, reducing the gains $G_x$ and $G_y$ to zero).

While many embodiments of the present invention have been shown and described, it is evident that variations and modifications are possible that are within the scope of the present invention described herein.

What is claimed is:

1. An intelligent assist device comprising:

an overhead motorized moveable trolley;

a support that extends downwardly from the trolley to a payload;

a sensor operatively coupled to the support to sense a characteristic of motion imparted by a human operator to the device; and a controller operatively coupled with the sensor and the trolley, the controller controlling movements of the trolley, the controller being configured to 1) estimate an amount of oscillation in the support in a higher frequency band by isolating signals received from the sensor that are within the higher frequency band, and 2) adjust movements of the trolley based on the estimation, wherein the higher frequency band is above a lower frequency band that contains the lowest natural frequency mode of oscillation of the device.

2. The intelligent assist device of claim 1, wherein the sensor comprises a cable angle sensor that senses an angle at which the support extends from the trolley.

3. The intelligent assist device of claim 1, wherein the sensor comprises a force sensor that senses a force imparted by the human operator to the device.

4. The intelligent assist device of claim 1, wherein the controller filters at least a portion of signals from the sensor that are indicative of the oscillation in the support.

5. The intelligent assist device of claim 4, wherein the controller comprises a low pass filter and a band pass filter.

6. The intelligent assist device of claim 5, wherein the low pass filter comprises a cut-off frequency of about 0.5 Hz.

7. The intelligent assist device of claim 5, wherein the band pass filter comprises a low cut-off frequency of about 1.5 Hz and a high cut-off frequency of about 5.0 Hz.

8. The intelligent assist device of claim 5, wherein the controller further comprises at least one rectifier configured to rectify the signals.

9. The intelligent assist device of claim 8, wherein the controller further comprises a second low pass filter.

10. The intelligent assist device of claim 9, wherein the second low pass filter comprises a cut-off frequency of about 0.5 Hz.

11. The intelligent assist device of claim 1, wherein the support comprises a cable.

12. The intelligent assist device of claim 1, wherein the support comprises a chain.

13. The intelligent assist device of claim 1, wherein the support comprises a rigid descender.

14. The intelligent assist device of claim 1, wherein the motion is imparted by the human operator to the payload and hence to the device through the support.

15. A method for controlling movement of an overhead moveable trolley in an intelligent assist device, the method comprising:

sensing a characteristic of motion imparted by a human operator to the device with a sensor;

estimating an amount of oscillation in the device in a higher frequency band by isolating signals received from the sensor that are within the higher frequency band; and adjusting movements of the trolley based upon the estimate, wherein the higher frequency band is above a lower frequency band that contains the lowest natural frequency mode of oscillation of the device.

16. The method of claim 15, wherein estimating the amount of oscillation comprises measuring the amount of oscillation in the device that does not correspond to the motion imparted by the human operator.

17. The method of claim 15, wherein sensing the characteristic of motion imparted by the human operator comprises sensing an angle at which a payload support extends from the trolley.

18. The method of claim 15, wherein sensing the characteristic of motion imparted by the human operator comprises sensing a force imparted by the human operator to the device.

19. The method of claim 15, wherein estimating the amount of oscillation comprises filtering at least a portion of signals generated from sensing the characteristic of motion imparted by the human operator.

20. The method of claim 19, wherein filtering the signals comprises passing the signals through a low pass filter and a band pass filter.

21. The method of claim 20, wherein the low pass filter comprises a cut-off frequency of about 0.5 Hz.

22. The method of claim 20, wherein the band pass filter comprises a low cut-off frequency of about 1.5 Hz and a high cut-off frequency of about 5.0 Hz.

23. The method of claim 19, wherein estimating the amount of oscillation further comprises passing the signals through a rectifier.

24. The method of claim 23, wherein estimating the amount of oscillation further comprises passing the signals through a second low pass filter.

25. The method of claim 24, wherein the second low pass filter comprises a cut-off frequency of about 0.5 Hz.

26. The method of claim 15, wherein adjusting the movements of the trolley comprises reducing a feedback gain when the amount of oscillation in the device that does not correspond to the motion imparted by the human operator exceeds a threshold level.

27. The method of claim 15, wherein the motion is imparted by the human operator to a payload and hence to the device through a support that extends downwardly from the trolley to the payload.

28. The intelligent assist device of claim 1, wherein the higher frequency band includes a higher frequency natural mode of oscillation in which the support and the payload swing out of phase with one another.

29. The intelligent assist device of claim 1, further comprising an overhead rail on which the trolley moves, wherein the higher frequency band includes a frequency associated with a torsional oscillation of the overhead rail.

30. The intelligent assist device of claim 1, wherein the support and the payload swing in phase with one another in the lowest natural frequency mode.

31. The intelligent assist device of claim 1, wherein the lower frequency band includes the motion imparted by the human operator.

32. The method of claim 15, wherein the higher frequency band includes a higher frequency natural mode of oscillation in which the support and the payload swing out of phase with one another.

33. The method of claim 15, wherein the intelligent assist device includes an overhead rail on which the trolley moves, and wherein the higher frequency band includes a frequency associated with a torsional oscillation of the overhead rail.

34. The method of claim 15, wherein the support and the payload swing in phase with one another in the lowest natural frequency mode.

35. The method of claim 15, wherein the lower frequency band includes the motion imparted by the human operator.

36. An intelligent assist device comprising:

an overhead motorized moveable trolley;

a support that extends downwardly from the trolley to a payload;

a sensor operatively coupled to the support to sense a characteristic of motion imparted by a human operator to the device; and a controller operatively coupled with the sensor and the trolley, the controller being configured to 1) estimate an amount of oscillation in the support in a frequency mode in which the support and the payload swing out of phase with one another by isolating signals received from the sensor that are in said frequency mode, and 2) adjust movements of the trolley based on the estimation.

37. An intelligent assist device comprising:

an overhead rail;

a motorized movable trolley supported by the overhead rail;

a support that extends downwardly from the trolley to a payload;

a sensor operatively coupled to the support to sense a characteristic of motion imparted by a human operator to the device; and a controller operatively coupled with the sensor and the trolley, the controller being configured to 1) estimate an amount of oscillation in the support in a frequency mode associated with a torsional oscillation of the overhead rail by isolating signals received from the sensor that are in said frequency mode, and 2) adjust movements of the trolley based on the estimation.

* * * * *